United States Patent [19]
Zarkhin

[11] Patent Number: 5,764,137
[45] Date of Patent: Jun. 9, 1998

[54] SYSTEM AND METHOD FOR DIAGNOSING LOSS OF PRESSURE IN TIRES OF A VEHICLE

[75] Inventor: Mikhail Zarkhin, Southfield, Mich.

[73] Assignee: Chrysler Corporation, Auburn Hills, Mich.

[21] Appl. No.: 761,953

[22] Filed: Dec. 9, 1996

[51] Int. Cl.[6] .................................................. B60C 23/00
[52] U.S. Cl. ...................... 340/444; 73/146.5; 340/442
[58] Field of Search ........................... 340/444, 443, 340/442; 73/146.2, 146, 146.5

[56] References Cited

U.S. PATENT DOCUMENTS

| | | | |
|---|---|---|---|
| 3,581,277 | 5/1971 | Beatty, Jr. et al. | 340/444 |
| 3,691,524 | 9/1972 | Frost et al. | 340/444 |
| 3,984,808 | 10/1976 | Laz et al. | |
| 4,224,597 | 9/1980 | DiCecio | 340/960 |
| 4,240,381 | 12/1980 | Lowther | |
| 4,346,940 | 8/1982 | Tatar | |
| 4,816,802 | 3/1989 | Doerksen et al. | 340/447 |
| 4,818,037 | 4/1989 | McEnnan | |
| 4,866,982 | 9/1989 | Gault | 73/146.5 |
| 4,890,090 | 12/1989 | Ballyns | 340/442 |
| 4,894,639 | 1/1990 | Schmierer | 340/444 |
| 4,919,392 | 4/1990 | Minuto | 254/126 |
| 4,954,677 | 9/1990 | Alberter et al. | 200/834 |
| 4,978,941 | 12/1990 | Brown | 340/447 |
| 4,980,680 | 12/1990 | Knoll et al. | 340/825.31 |
| 5,055,826 | 10/1991 | Ballyns | 340/442 |
| 5,083,457 | 1/1992 | Schultz | 73/146.5 |
| 5,218,862 | 6/1993 | Hurrell, II et al. | 340/444 |
| 5,251,848 | 10/1993 | Gannatal | 244/103 |
| 5,289,160 | 2/1994 | Fiorletta | 340/447 |
| 5,442,331 | 8/1995 | Kishimoto et al. | 340/444 |
| 5,535,124 | 7/1996 | Hosseini et al. | 364/426.03 |
| 5,569,848 | 10/1996 | Sharp | 340/444 |

OTHER PUBLICATIONS

"The Michelin–BMW Tire Pressure Checking System. The First Step Towards the Development of an Active Tire", H. Wallentowitz, H. Riedi, H. Bruns.

Primary Examiner—Brent A. Swarthout
Attorney, Agent, or Firm—Mark P. Calcaterra

[57] ABSTRACT

A system and method for diagnosing when a tire of a vehicle is beginning to lose pressure. The vehicle has four wheels, and four associated tires mounted thereon, each with an associated angular speed when the vehicle is in motion. Four wheel speed sensors are attached to one of the four wheels of the vehicle for sensing the angular speed of each wheel. A microprocessor is also included that is electrically coupled to each of the wheel speed sensors for receiving the angular speed of each wheel. The microprocessor integrates, over time, the angular speed of each wheel. An indicator is also provided that is coupled to the microprocessor for indicating that a tire of the vehicle is losing pressure if the microprocessor determines that the integral of the angular speed of one of the tires is greater than the integral of the angular speed of the other tires. A method is also provided for diagnosing when one of the vehicle tires is beginning to lose pressure, such as in the case of a slow leak.

8 Claims, 3 Drawing Sheets

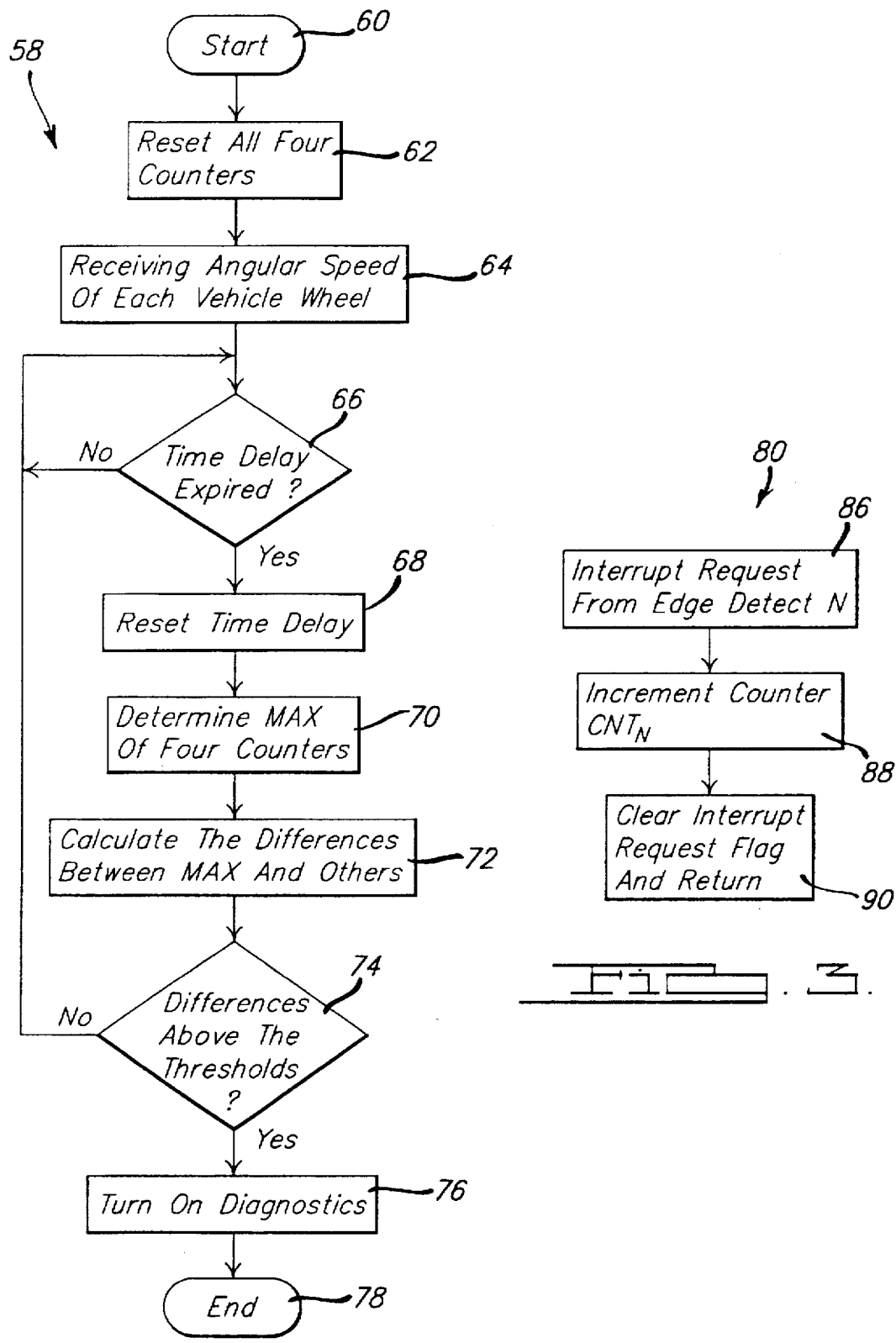

SYSTEM AND METHOD FOR DIAGNOSING LOSS OF PRESSURE IN TIRES OF A VEHICLE

BACKGROUND

1. Field of the Invention

In general, the present invention relates to diagnostic systems for vehicles, and in particular, the present invention relates to a system and method for diagnosing a low pressure tire of a vehicle.

2. Description of the Related Art

Modern vehicles have a large number of different systems, proper operation of which effects the vehicle's overall safety, operability, and drivability. It is important to inform the driver as quickly as possible if the vehicle is not operating at its peak performance. Currently, vehicles provide information to the driver by different diagnostic systems, which generally are restricted to critical engine parameters. Few existing systems, however, provide information about tire condition, which may be of great importance to the operation of the vehicle.

Current tire monitoring systems are very costly and add weight to the vehicle via extra sensors and computer hardware. These systems typically monitor and measure tire pressure by the use of extra electromechanical devices that are added to a vehicle in the after-market, such as U.S. Pat. No. 5,289,160 to Fiorletta, U.S. Pat. No. 4,816,802 to Doerksen, and U.S. Pat. No. 4,894,639 to Schmierer. These patents and others in the area of tire monitoring systems, employ special hardware that is attached to the tire or wheel system of the vehicle for measuring tire pressure loss. In operation, the systems relay information via electromechanical means to warn a vehicle operator if pressure in one of the tires is getting low. The systems have, however, proved to be very expensive, difficult to install, and somewhat unreliable during practical applications. Further, devices have been provided for controlling differential driven wheel slip, such as U.S. Pat. No. 5,535,124 to Hosseini. These types of devices do not adequately detect and indicate to a vehicle operator when a tire of the vehicle has begun to go flat.

It would, therefore, be desirable in the present art to have a system and method for diagnosing a low pressure tire of a vehicle that uses existing vehicle hardware such as an anti-lock braking system and that will indicate to an operator when one of the vehicle's tires has a relatively lower pressure and, perhaps, is beginning to lose pressure without directly measuring pressure in any of the tires. It would also be desirable to have a system and method that detects when a tire is losing pressure by simply integrating angular speed of each wheel that each tire of the vehicle is mounted on, over time, and determining from the integration whether one of the tires of the vehicle is beginning to loose pressure via a slow leak.

SUMMARY OF THE INVENTION

The present invention eliminates the disadvantages in the prior art by providing a system and method for diagnosing loss of pressure in tires of a vehicle. The vehicle preferably has four wheels, upon which the tires are mounted, each with an associated angular speed when the vehicle is in motion. A wheel speed sensor is attached to each of the four wheels of the vehicle, such as in an anti-lock braking system, for sensing the angular speed of each wheel. A microprocessor is also included that is electrically coupled to each of the wheel speed sensors for receiving the angular speed of each wheel. The microprocessor integrates, over time, the angular speed of each wheel. It is expressly understood that this integration of the angular speed over time will simply be referred to as the "angular speed" when stated below in the present invention. An indicator is also provided that is coupled to the microprocessor for indicating the presence of a tire with low air pressure, if the microprocessor determines that the angular speed of one of the tires is greater than the angular speed of the other tires.

The method includes the steps of receiving the angular speed of each wheel and determining the angular speed of each wheel over time. Next, the method determines whether the angular speed of one wheel is greater than the angular speed of the other wheels and above a threshold value. If the answer is yes, the method indicates to an operator of the vehicle, via an indicator, that a tire of the vehicle is losing pressure.

Other objects, features and advantages of the present invention will become apparent by reference to the following detailed description when considered in conjunction with the accompanying drawings.

BRIEF DESCRIPTION OF THE DRAWINGS

In the drawings below, reference characters refer to like parts throughout the views, and wherein:

FIG. 2 is a flow chart diagram of a method, for diagnosing loss of pressure in vehicle tires, of the present invention;

FIG. 3 is a flow chart diagram showing microprocessor interruption steps of the method of FIG. 2 of the present invention.

DESCRIPTION OF THE PREFERRED EMBODIMENT(S)

Figure 1:
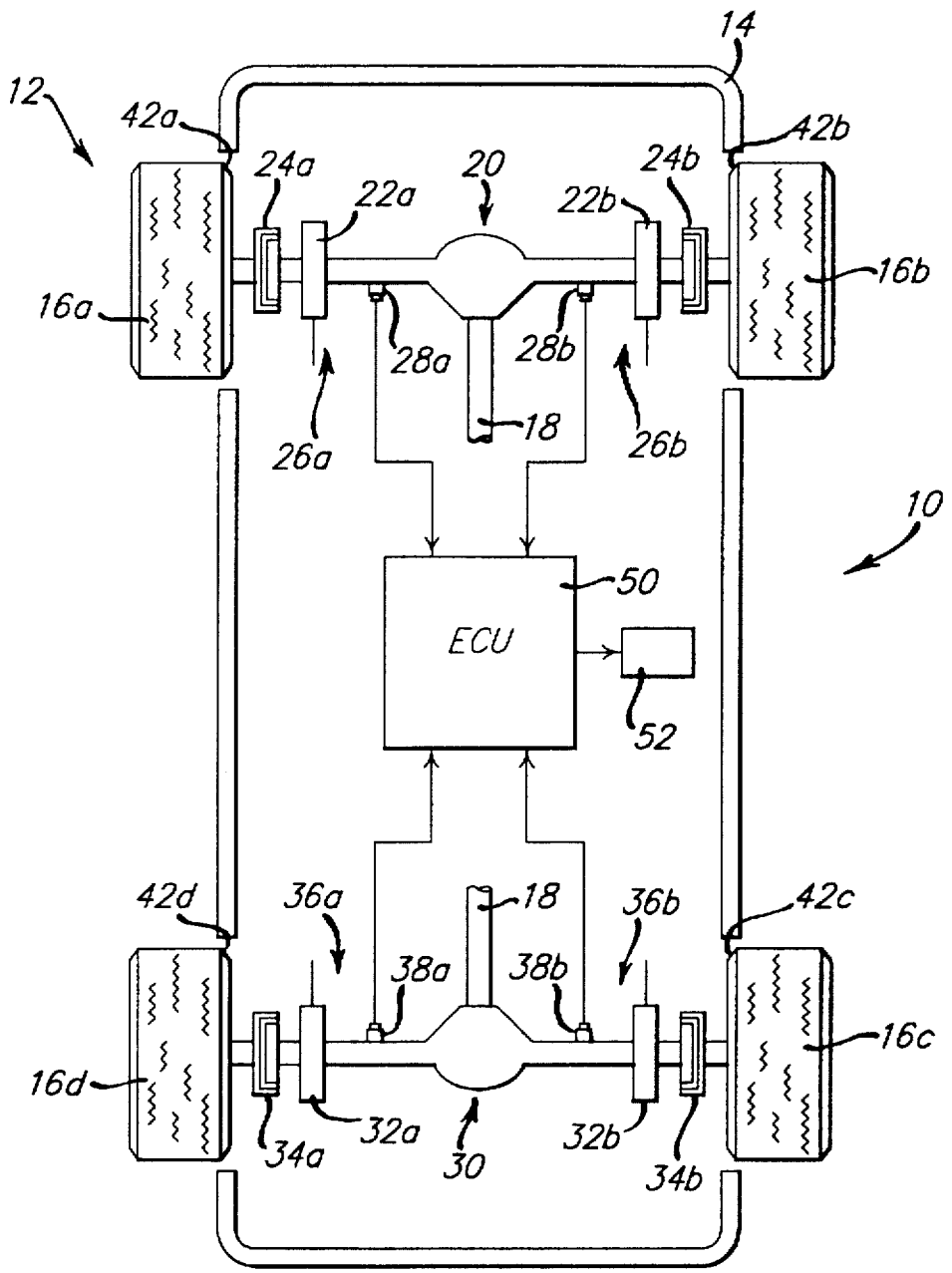
FIG. 1 is a schematical plan view of a system, for diagnosing loss of pressure in vehicle tires, of the present invention.

Commencing with FIG. 1, a system 10 for monitoring and diagnosing loss of pressure in four tires 16a, 16b, 16c, and 16d of a vehicle 12 is shown. Each tire 16a, 16b, 16c, and 16d is mounted on an associated wheel 42a, 42b, 42c, and 42d,respectively, of the vehicle 12. Each wheel 42d has an associated angular speed $W_f$ when the vehicle 12 is in motion. The angular speed of each wheel 42a, 42b, 42c, and 42d,is governed by the equations:

$$2\pi R_f W_f = 2\pi R W$$

$$R_f W_f = R W$$

$$W_f = \frac{R}{R_f} W; \frac{R}{R_f} > 1$$

whereby R equals the radius of any particular wheel; $R_f$ equals the radial speed of the tire with low pressure; and W equals the angle of wheel rotation. Since radius R will always be greater than $R_f$, thus $W_f$ is always greater than W though the difference can be infinitely small. Therefore, integration of the angular speed over time is required for the microprocessor to determine which tire is losing pressure.

The vehicle 12 includes a frame 14 and a drive shaft 18 that runs longitudinally along the undercarriage of the vehicle 12. The wheels 42a, 42b, 42c, and 42d are driven by an engine (not shown) through drive shaft 18, respective first and second axles 20, and 30, and final drive devices 24a, 24b, 24c, and 24d. The first axle 20 has an anti-lock braking systems 26a and 26b, which includes braking mechanisms 22a and 22b and wheel speed sensors or transducers 28a and 28b. Similarly, the second axle 30 includes an anti-lock braking systems 36a and 36b having braking mechanisms 32a and 32b and wheel speed sensors 38a and 38b, respectively.

Each wheel speed sensor or transducer 28a, 28b, 38a, and 38b produces respective pulse signals having values responsive to, or representing, the angular speed W of the wheels 42a, 42b, 42c, and 42d of the vehicle 12. The wheel speed sensors of the present system 10 are each attached to one wheel of the vehicle 12 for sensing the angular speed. Each transducer 28a, 28b, 38a, and 38b is preferably a Hall Effect Sensor. Other transducers, however, such as optical and electromagnetic devices may also be employed as alternatives in the present invention. Also, the phrase "wheel speed sensor" is to be construed in general terms and not as a strict scientific term because the ECU 50 typically has to compute or perform some calculations to determine the wheel speed and such information is usually not directly fed from the wheel speed sensors.

The present system 10 further includes a microprocessor or Electronic Control Unit (ECU) 50 that is electrically coupled to each of the transducers 28a, 28b, 38a, and 38b for receiving the angular speed W of each wheel 42a, 42b, 42c, and 42d. The ECU 50 includes a CPU memory (volatile and non-volatile), bus lines (address, control, and data), and other hardware, software, and firmware needed to perform the task of data manipulation of an electrical signal.

During movement of the vehicle 12, the ECU 50 is continuously receiving the angular frequency signals of the wheels 42a, 42b, 42c, and 42d and integrating, over time, the electrical signals representing the angular speed of each wheel 42a, 42b, 42c, and 42d, and comparing the results. If the pressure in one of the tires 16a, 16b, 16c, and 16d, is significantly less than in the others, then the corresponding integral for that tire will be the maximum of the integrals computed for each tire over time. This is a result of the "effective" diameter of the tire with less pressure being smaller than the others and so the corresponding angular speed for the wheel upon which it is mounted is higher than the others.

The integral for each iterative pulse is governed by the equation:

$$I_k = \int_{-\infty}^{t} W_k(t)dt; \ k = 1,2,3,4$$

If the integral $I_k$ angular speed $W_f$ of the wheel is greater than the integral of the other three wheels by a predetermined threshold value that is stored in the memory of the ECU 50, the ECU 50 will send an electrical signal to an indicator 52 that is coupled to the ECU 50. The indicator 52 indicates when one of the fires 16a, 16b, 16c, and 16d, of the vehicle 12 is losing pressure if the ECU 50 determines that the angular speed of one of the wheels 42a, 42b, 42c, and 42d is greater than the angular speed of the other wheels. In the preferred embodiment, the indicator 52 is a Malfunction Indicator Light (MIL) for notifying a vehicle operator when pressure in one of the tires 16a, 16b, 16c, and 16d, becomes low.

The present system 10 considers if the angular speed of one tire is greater than the other three tires taken from an average value integrated over time. It is understood that, external factors acting upon the wheels 16a, 16b, 16c, and 16d, of the vehicle 12 may result in the angular speed of one of the wheels being greater than the others. For example, if one of the wheels was spinning on ice or snow. In addition, if a flat tire has been replaced by a smaller size spare tire such that the associated vehicle wheel will have an angular speed that is greater than the other wheels of the vehicle. But, in each of these instances, the vehicle operator will be aware of the external circumstances that may be causing the indicator to indicate to the driver that there may be a pressure problem with one of the tires.

Figure 4:
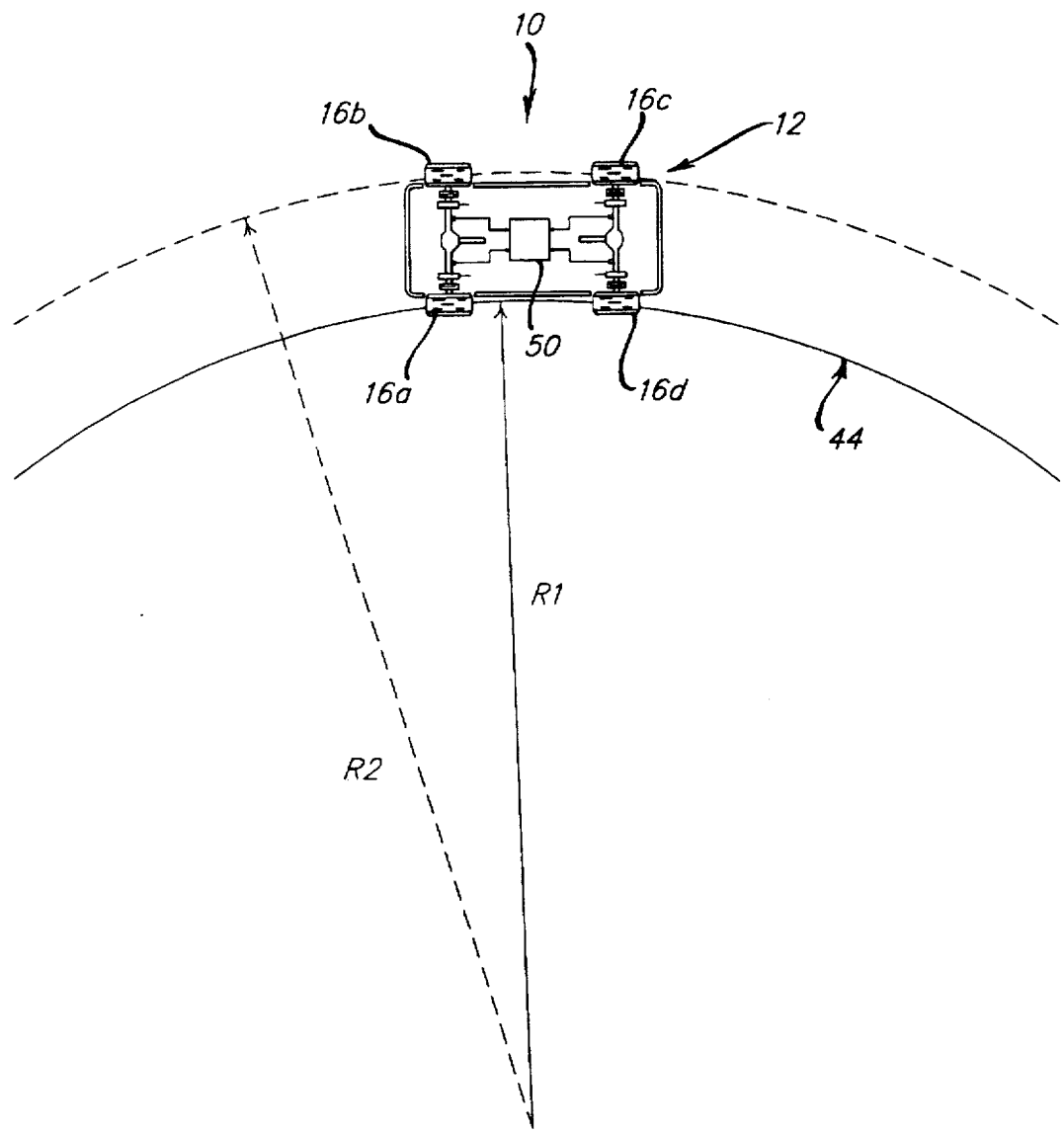
FIG. 4 is a schematical plan view of the vehicle traversing a curved roadway, and system for diagnosing loss of pressure in vehicle tires, of the present invention.

Another more common example, is shown in FIG. 4, which illustrates the vehicle 12 traversing a curved pathway 44. In this instance, the inner tires 16a, and 16d, which are following an arced path with radius R1, will have an angular speed that is less than the outer tires 16b and 16c, which are following an outer arced curve path with larger radius R2. The present system 10, however, will rectify this situation since two wheels of the vehicle will have an approximately equal angular speed as opposed to only one wheel when one of the tires has less pressure than the others. In operation, if it is determined by the ECU 50 that one of the tires 16a, 16b, 16c, or 16d is losing pressure, the present invention may then check the tire opposite tire on the same side of the vehicle 12. If both tires on the same side of the vehicle are uniformly low in pressure, then it is determined that the vehicle 12 is traversing a curved pathway such as in FIG. 4, and an indication is not made to the vehicle operator.

Referring to FIG. 2, a method for diagnosing the four tires 16a, 16b, 16c, and 16d, of vehicle 12 is shown. The method 58 begins or starts at bubble 60 where the ECU 50 calculates four different integrals of the angular speed of each of the wheels 42a, 42b, 42c, and 42d, of the vehicle 12. In the preferred embodiment, the ECU 50 employs four separate 32 bit up-down counters (not shown) each for an associated wheel speed integral, but it is appreciated than any N-bit counter could be used depending on the application desired. The method 58 falls to block 62 whereby the four up-down counters are reset. Method 58 next falls to block 64 whereby the angular speed of each wheel 42a, 42b, 42c, and 42d, of the vehicle 12 is received by the ECU 50 via transducers 28a, 28b, 38a, and 38b.

The method 58 next falls to decision block 66 where it is determined if a set time delay has expired. If the ECU 50 determines that is has not, the method 58 continues to loop back to decision block 66 until the time delay has expired. The method 58 then falls to block 68 where the time delay is reset in the memory of the ECU 50. The method 58 next falls to block 70 where the max value, representing the maximum angular speed of one of the wheels 42a, 42b, 42c, and 42d, is determined from the four counters. The method 58 then falls to block 72 where the differences between the maximum value of one of the counters and the other counters is calculated by the ECU 50. The method 58 continues to decision block 74 where it is determined if the max value difference calculated in block 72 is greater than a set threshold value, such as a value stored in a data table that corresponds to a ratio of desired fire pressure values. If the difference is not, the method returns to decision block 66. If the answer, however, in decision block 74 is yes, the method falls to block 76 whereby the ECU 50 has determined that pressure in one of the tires 16a, 16b, 16c, and 16d, is getting low and the diagnostics indicator 52 is turned on. The method 58 next falls to bubble 78 where it is stopped or ended and the ECU 50 performs other vehicle diagnostics.

During operation of the method 58, each electrical signal pulse from one of the transducers 28a, 28b, 38a, and 38b, breaks the method 58 and sends it to interrupt sub-routine, or method 80 that is shown in FIG. 3. The method counts each revolution of each tire and stores these values in the respective up-down counters. The method 80 first determines in block 86 that an interrupt request from an edge detector has been received. The method 80 continues to block 88 where a counter designated as $CNT_N$ is incremented. The method 80 of the interrupt sub-routine next falls to block 90 where an interrupt and request flag is cleared and returns to method 58.

While the invention has been described in detail, it is to be expressly understood that it will be apparent to persons skilled in the relevant art that the invention may be modified without departing from the spirit of the invention. Various changes of form, design or arrangement may be made to the invention without departing from the spirit and scope of the invention. Therefore, the above mentioned description is to be considered exemplary, rather than limiting, and the true scope of the invention is that defined in the following claims.

What is claimed is:

1. A system for diagnosing loss of tire pressure in tires of a vehicle, the system comprising:

a wheel having a corresponding tire mounted thereon;

a wheel speed sensor attached to each wheel for sensing an angular speed of the wheel; and a microprocessor electrically coupled to each of the wheel speed sensors for receiving the angular speed of each wheel, the microprocessor integrating, over time, the angular speed of each wheel to yield a set of integrated angular speeds determining a maximum value from the set of integrated angular speeds, determining a set of value differences consisting of the differences between the maximum value and each of the integrated angular speeds, determining a maximum value difference from among the set of value differences determining if the maximum value difference is greater than a predetermined threshold value and determining that there is loss of tire pressure in a tire if the determined maximum value difference is greater than the predetermined threshold value.

2. A method for diagnosing loss of tire pressure in tires of a vehicle, the method comprising the steps of;

measuring an angular speed of a wheel having a tire mounted thereon;

determining an integral of the angular speed of each wheel over time to yield a set of angular speed integrals;

determining a maximum angular speed integral value among the set of angular speed integrals;

determining for each wheel a value difference between the maximum angular seed integral value and the integral of the angular speed for each wheel, determining the maximum value difference among the value differences for each wheel and determining if the maximum value difference is above a predetermined threshold value; and determining that there is loss of tire pressure in a tire if the determined maximum value difference is greater than the predetermined threshold value.

3. The method of claim 2 including the step of indicating there is a loss of tire pressure if a loss of tire pressure is determined.

4. The method of claim 2 including the step of determining whether another wheel on the same side of the vehicle as the wheel having a loss of tire pressure has a similar angular wheel speed.

5. The method of claim 4 including the step of determining that there is not a loss of pressure in the tire if the angular wheel speed of the wheel and the other wheel are similar.

6. A method for diagnosing loss of tire pressure in four tires of a vehicle, the method comprising the steps of:

measuring an angular speed of a wheel having a tire mounted thereon;

determining an integral of the angular speed of each wheel over time;

determining a maximum integral of the angular speed of each wheel to yield a set of maximum angular speed integrals;

determining a maximum value from the maximum angular speed integrals;

determining for each wheel a maximum value difference between the maximum value and maximum integral of the angular speed of each wheel; determining a maximum difference from the maximum value differences;

determining if the maximum difference is above a predetermined threshold value; and determining that a tire is losing pressure if the maximum difference is above the predetermined threshold value.

7. The method of claim 6 including the step of determining whether another wheel on the same side of the vehicle as the wheel having a loss of tire pressure has a similar angular wheel speed.

8. The method of claim 7 including the step of determining that there is not a loss of pressure in the tire if the angular wheel speed of the wheel and the other wheel are similar.

\* \* \* \* \*